United States Patent Office
3,197,417
Patented July 27, 1965

3,197,417
METHOD OF PREPARING A NICKEL-ALUMINUM CHLORIDE ON ETA-ALUMINA CATALYST COMPOSITION
Hillis O. Folkins, Crystal Lake, and Elmer L. Miller, Cary, Ill., assignors to The Pure Oil Company, Chicago, Ill., a corporation of Ohio
No Drawing. Filed Apr. 19, 1961, Ser. No. 103,983
2 Claims. (Cl. 252—442)

This invention relates to new and useful improvements in processes for the isomerization of n-butane, and further to the preparation of isomerization catalysts used in the process.

Isomerization has recently come into prominence as a unit process in the petroleum industry for increasing the octane number of low-molecular-weight, saturated liquid aliphatic hydrocarbons. In particular, the isomerization of n-butane has been investigated due to the extensive use of isobutane as an alkylation feed. The isomerization of n-pentane and n-hexane has also been extensively investigated due to the fact that isopentanes and isohexanes have substantially higher octane numbers than the corresponding normal paraffins. There have been developed several high-temperature processes for the isomerization of n-pentane and n-hexane utilizing catalysts which consist of a small amount of a hydrogenation component supported on a hydrocarbon cracking catalyst, such as silica-alumina. Several processes are known which use catalysts consisting of a platinum-group metal on activated alumina. These processes are variations of the well-known reforming processes and operate at temperatures not far below those of reforming processes, viz., 850–950° F. Another process which has been developed for the isomerization of low-molecular-weight aliphatic hydrocarbons utilizes a catalyst consisting of palladium supported on an acidic hydrocarbon cracking catalyst, e.g., silica-alumina (having a high proportion of silica), either alone or with combined fluorine. This process operates at a somewhat lower temperature, viz., 650°–775° F., than the aforementioned isomerization processes. Still another process which has been developed for the isomerization of pentanes, hexanes, and heptanes, utilizes a catlyst consisting of nickel or various nickel compounds, supported on an acidic hydrocarbon cracking catalyst, such as silica-alumina. This process operates in a temperature range of about 600°–700° F., and is operative to the extent that fair yields of isoparaffins can be obtained at relatively low space velocities. However, it has been found that nickel-containing silica-alumina catalysts are generally less active than palladium- or platinum-containing catalysts, and produce excessive hydrocracking when used at a high enough temperature to obtain reasonably high yields of isoparaffins. In the development of the various high-temperature isomerization processes, it has been found that n-butane is the most difficult of the low-molecular-weight paraffins to isomerize. As a result, studies of isomerization of low-molecular-weight aliphatic hydrocarbons have continued in an effort to develop a process which can be efficiently operated at lower temperatures and which is applicable to butane, as well as pentane and hexane.

During and immediately after World War II, there were developed several processes for the isomerization of n-butane which were applicable to a limited extent to n-pentane and n-hexane. These processes utilized a Friedel-Crafts catalyst, viz., aluminum chloride, activated with gaseous hydrogen chloride, and operated at a temperature in the range from about 200°–500° F. These processes were used during the war for the production of isobutane for use as a feed in various alkylation processes, and also for the isomerization of n-pentane and n-hexane to produce high-octane-number blending stocks. The low-temperature, aluminum chloride catalyzed isomerization processes, however, have not had wide-spread commercial acceptance in the petroleum industry due to the problem of corrosivity of the catalyst and hydrogen chloride activator, and due to the problem of recovering and regenerating the contaminated catalysts. In British Patent 555,861 there is described a process for isomerization of olefins or mixtures of olefins and paraffins, using a combination hydrogenation and Friedel-Crafts-type isomerization catalyst. In the British patent, a catalyst is described which consists of nickel on activated charcoal in admixture with about 10% wt. aluminum chloride. This catalyst is stated to be effective in hydrogenating the olefins and isomerizing the product. Recently, a process has been developed by Bloch and Haensel, Patent 2,900,425, which has combined the catalysts used in the high-temperature and low-temperature isomerization processes. Bloch and Haensel have produced a catalyst consisting of a platinum-group metal on activated alumina containing aluminum chloride in a chemically bound form, e.g., chemically combined with the catalyst support through the surface hydroxyl groups in the support. The catalyst of Bloch and Haensel is reported to be effective in the isomerization of n-butane at temperatures above about 350° F.

In the copending patent application of Elmer L. Miller, Theodore R. Embach, and Hillis O. Folkins, Serial No. 65,606, filed October 28, 1960 now Patent No. 3,150,206, there is described a process for isomerization of butane at lower temperatures and at higher yields and selectivities than have been possible using prior art technique. In the Miller et al process, nickel is deposited on alumina, preferably the eta form of alumina, as a water-soluble salt and reduced to metallic form by treatment with hydrogen at elevated temperature. The reduced catalyst is then treated with anhydrous aluminum chloride at a temperature sufficient to effect reaction between aluminum chloride and the surface hydroxyl groups in the alumina support. The catalyst which is thus produced is effective in isomerizing n-butane at temperatures in the range from about 200°–600° F. The isomerization reaction can be carried out at temperatures as low as 200°–300° F., although temperatures in a range of 300°–500° F. are preferred, and temperatures as high as 600 F. may be used. The catalysts which are used in this process are preferably supported on eta-alumina inasmuch as those catalysts appear to be much more active and are more resistant to aging upon extended use. Further investigation, however, has shown that the more active catalysts prepared from palladium, platinum, or nickel on eta-alumina are difficult to form due to the hard abrasive character of eta-alumina. We have found that eta-alumina is extremely difficult to pellet and catalysts based on eta-alumina are costly to produce because of attrition and wear in the punches and dies of the tableting machines. The pelleting of eta-alumina is especially difficult because of its peculiar crystalline structure which is extremely hard and abrasive. The formation of eta-alumina into catalyst pellets cannot be accomplished by merely adjusting the water content of the alumina to a desired value and the problems encountered in pelleting are not overcome merely by use of binders.

It is therefore an object of this invention to provide an improved isomerization process utilizing a novel catalyst consisting essentially of nickel, platinum, or palladium on eta-alumina, with or without combined aluminum chloride.

Another object of this invention is to provide a new and improved and highly active isomerization catalyst.

Another object of this invention is to provide an improved process for the preparation of a highly active isomerization catalyst.

Still another object of this invention is to provide an improved process for the preparation of eta-alumina pellets suitable for use as a support for an isomerization catalyst.

A feature of this invention is the provision of an improved isomerization process in which n-butane is isomerized by contact with a composite catalyst consisting essentially of nickel, platinum, or palladium on eta-alumina, with or without combined aluminum chloride, prepared by impregnating beta-alumina trihydrate with a solution of a compound of the promoter metal, forming the impregnated material into pellets and calcining the pellets to convert the support to eta-alumina.

Another feature of this invention is the provision of an improved isomerization catalyst prepared by impregnating beta-alumina trihydrate with a promoter metal, forming the impregnated material into catalyst pellets, and calcining the catalyst pellets to convert the support material into eta-alumina.

Still another feature of this invention is the provision of an improved process for preparation of a highly active isomerization catalyst in which a small amount of nickel, platinum, or palladium is deposited on a support consisting of beta-alumina trihydrate, formed into pellets, calcined to convert the support into eta-alumina, reduced with hydrogen at an elevated temperature, heated with aluminum chloride at a temperature sufficient to effect reaction with surface hydroxyl groups in the alumina, and purged in a stream of inert gas to remove excess aluminum chloride and by-product hydrogen chloride.

Still another feature of this invention is the provision of an improved process for the preparation of pellets of beta-alumina which comprises forming beta-alumina trihydrate into pellets and calcining the pellets to convert the same into eta-alumina.

Other objects and features of this invention will become apparent from time to time throughout the specification and claims as hereinafter related.

In this invention, beta-alumina trihydrate (which normally contains about 30% water) is slowly calcined at temperatures between about 450° and 600° F. to partially remove the water of hydration. Under these conditions, water is removed until the water content of the treated material is between 3 and 15%, preferably between about 4 and 10%. After treatment under these conditions, the alumina hydrate is readily formed into smooth pellets of high physical strength with low attrition of punches and dies. Binders or lubricants, such as graphite, stearic acid, etc., may be added (generally in the amount of 0.25 to 5%), to further aid in the tableting process. In the formation of tablets or pellets it is desirable to keep the water content within the ranges indicated above. If the water content is in excess of about 15%, the flow characteristics of the material into the dies is poor. If the water content is reduced below the minimum specified, pelleting or tableting is difficult because of severe attrition and wear on punches and dies. Similarly, at low water contents, the tablet which is formed tends to crumble unless very high compression loads are applied. Similarly, if temperatures substantially in excess of 600° F. are employed to dry the alumina to a water content within the range indicated above, the alumina is converted into a form which is hard and abrasive, thus producing severe attrition of dies and punches. When the partially dehydrated beta-alumina trihydrate is formed into tablets, they are calcined slowly to around 1000° F. to convert the beta-alumina trihydrate to eta-alumina. A very slow calcination is necessary to prevent the beta-alumina trihydrate from changing to gamma-alumina rather than to eta-alumina. Eta-alumina pellets which are prepared in this manner can be impregnated with a solution of a promoter metal and activated in accordance with prior art techniques.

When isomerization catalysts are prepared in accordance with this invention, it is possible to obtain higher isomerization yields than with prior art catalysts. In this invention, a powdered beta-alumina trihydrate (which normally contains around 30% water) is slowly calcined at temperatures between 450° and 600° F. to partially remove the water of hydration. Under these conditions, water is removed until the water content of the treated material is between 3 and 15%, preferably between 4 and 10%. The powdered material is then impregnated with a solution of a metal compound of the desired metal promoter, e.g., nickel, platinum, or palladium. The powder is impregnated with the metal salt solution to produce the desired concentration of metal, e.g., 0.1–1.0% of platinum or palladium, or 0.5–5.0% nickel, in the resulting catalyst. The powdered material is then dried to a water content of about 5–15% to 230°–400° F., and tableted. The addition of the metal salt prior to the pelleting further adds to the ease and efficiency of tableting. After tableting, the material is slowly heated to 1000° F., to convert the alumina support to the eta form. The impregnation of the support material with the promoter metal while in the beta-alumina trihydrate form, followed by calcination to convert the support to the eta form results in an interaction between the promoter metal and the support which produces a more active isomerization catalyst. Catalysts which are prepared in this manner using platinum or palladium as the metal promoter are useful, after reduction with hydrogen, in the isomerization of n-butane at 800°–900° F., and a pressure of about 200–1000 p.s.i.g.

When catalysts are prepared as above described by impregnation of beta-alumina trihydrate with a solution of a nickel, platinum, or palladium compound, dried, pelleted, calcined to convert the support to eta-alumina, and reduced with hydrogen, the resulting catalyst can be converted to a form which is active for isomerization at substantially lower temperatures by treatment with aluminum chloride. The impregnated catalyst, prepared as above described, is heated with sufficient aluminum chloride at a temperature (preferably about 200°–600° F.) sufficient to cause reaction with surface hydroxyl groups in the eta-alumina to retain about 10–20% aluminum chloride in chemically combined and chemisorbed form in the catalyst. The catalyst is subsequently heated in an inert gas (e.g., nitrogen, hydrogen, helium, etc.) to remove aluminum chloride in excess of that reacted and chemisorbed, and to remove adsorbed hydrogen chloride. The catalysts which are prepared in this manner are very active in the isomerization of n-butane at temperatures in the range from about 200°–600° F. and pressures of about 0–1000 p.s.i.g.

The following non-limiting examples are illustrative of the scope of the subject invention.

*Example I*

Powdered beta-alumina trihydrate was calcined by slowly heating to 1000° F. to convert it to eta-alumina without appreciable formation of gamma-alumina. The calcined material was then used in the formation of tablets for catalyst use. The calcined eta-alumina was formed into tablets only with great difficulty, and then only when 3% graphite was added as a binder. The tablets which were formed were poorly shaped and tended to erode considerably with use.

*Example II*

In another experiment, powdered beta-alumina trihydrate was dried at a temperature between 450° and 600° F. to a water content of about 10%. The dried, powdered beta-alumina hydrate was mixed with about 1% graphite and formed into pellets. Good pellets of satisfactory shape and uniformity were obtained with much less binding and wear on the machine. These pellets were then calcined slowly at temperatures gradually increasing to 1000° F., until the beta-alumina hydrate was completely converted to the eta-alumina. The resulting pellets of eta-alumina were superior in strength and uniformity to those obtained using prior art techniques. The catalyst pellets show little or no attrition in normal fixed-bed use.

*Example III*

A small quantity of beta-alumina trihydrate was heated in air to 1000° F. to convert the alumina to the eta-form. The eta-alumina was then impregnated with an aqueous solution of nickel nitrate hexahydrate (8.4 grams in 206 ml. of water) and the resulting mass was stirred and slowly dried at 230° F. for 16 hours. The dried material, to which 3% graphite was added, was pelleted into ⅛-inch pellets. Pelleting was difficult and tablets of inferior quality and poor shape and strength were obtained. The material was then treated by heating in a stream of hydrogen at 1000° F. to reduce the nickel to elemental form. Aluminum chloride was then added to the catalyst by reaction under pressure in a bomb maintained at 500° F. The catalyst was removed from the bomb and heated in a nitrogen atmosphere at 400° F. and atmospheric pressure for two hours to remove aluminum chloride in excess of that reacted and chemisorbed in the catalyst, and to remove adsorbed by-product hydrogen chloride. The catalyst which was thus prepared was used in the isomerization of n-butane at 300° F., atmospheric pressure, contact time with the catalyst of 22 seconds, and in absence of hydrogen. In this experiment, isobutane was obtained in a yield of 40%.

*Example IV*

In another experiment, a catalyst was prepared in accordance with this invention. A quantity of powdered beta-alumina trihydrate containing about 30% water was heated in air at 550° F. until the water content had been reduced to 5% wt. The partially dried alumina hydrate (170 grams) was impregnated with an aqueous solution of nickel nitrate hexahydrate (8.4 grams in 206 ml. of water). The resulting mass was stirred and slowly dried at 230° F. for 16 hours. The dried material was mixed with 1% wt. graphite and was pelleted in ⅛-inch pellets and activated by heating in an atmosphere of hydrogen to 1000° F. in order to convert the beta-alumina to eta form. The catalyst was then treated with aluminum chloride at a temperature of 500° F. in a bomb. This reaction was carried out for a time sufficient for the aluminum chloride to react with the hydroxyl groups in the alumina and produced a catalyst containing about 18% wt. combined aluminum chloride. The composite catalyst was then removed from the bomb and charged to a reactor without undue exposure to atmosphere. The catalyst was further treated by heating in a hydrogen atmosphere at 400° F. for two hours. This treatment was sufficient to remove aluminum chloride in excess of that reacted and chemisorbed, and to remove adsorbed by-product hydrogen chloride. The catalyst was then used in the isomerization of n-butane in the absence of hydrogen at a temperature of 300° F., atmospheric pressure, and a contact time of n-butane with the catalyst of 22 seconds. Under these conditions isobutane was obtained in a yield of 50% wt. and selectivity of 92%. When this catalyst is used in the isomerization of n-butane at temperatures of about 250–275° F., there is little or no decrease in isobutane yield and the selectivity for formation of isobutane is increased to about 95–100%. Similarly, when a catalyst is made in the same manner but is impregnated with only 15% wt. aluminum chloride, and used in the isomerization of n-butane under the above-noted reaction conditions, isobutane is obtained in yields in excess of 50% and a selectivity of about 98%.

*Example V*

Pellets of eta-alumina are prepared as described in Example III and are impregnated with 0.6% wt. platinum. The resulting catalyst is heated with aluminum chloride at a temperature of 500° F. to produce a catalyst having 22% combined aluminum chloride. The resulting catalyst is heated in an inert atmosphere at a temperature of 400° F. to remove excess aluminum chloride and adsorbed by-product hydrogen chloride. This catalyst is used in the isomerization of n-butane in admixture with hydrogen at a hydrogen/butane mol ratio of 0.5, a pressure of 300 p.s.i.g., a reaction temperature of 400° F., and a contact time of 60 seconds. Under these conditions, isobutane is obtained in a yield of about 37%.

*Example VI*

A small portion of beta-alumina trihydrate is dried at 550° F. to a water content of 5%. The dried, powdered beta-alumina hydrate is impregnated with an aqueous solution of palladium chloride, stirred, and dried at 230° F. for 16 hours. The dried material is mixed with 1% graphite, formed into ⅛-inch pellets and reduced in a hydrogen atmosphere at 1000° F. to convert the beta-alumina to the eta form. The catalyst is then treated in a bomb with aluminum chloride at 500° F. until the catalyst contains about 15% of combined aluminum chloride. When this catalyst is used in the isomerization of n-butane under the same conditions used with the aforementioned platinum-containing catalyst, isobutane is obtained in a substantially improved yield (about 43%). Additionally, the catalysts prepared in this manner are easier to form, are substantially stronger, and are resistant to attrition during extended use in a fixed-bed reactor. When a catalyst is prepared in the same manner substituting palladium for platinum in the catalyst composition, an isomerization catalyst of improved activity and superior physical strength is obtained.

*Example VII*

A quantity of beta-alumina trihydrate is heated in air to 1000° F. slowly to convert the alumina to the eta-form. The eta-alumina is then impregnated with a solution of palladium chloride sufficient to produce a concentration of 0.5% palladium in the catalyst. The resulting mass is dried at 230° F. for 16 hours, mixed with 3% graphite, and formed into ⅛-inch pellets. Pelleting is extremely difficult and tablets of inferior quality are obtained. The catalyst pellets are then activated by heating in a stream of hydrogen at about 975° F.

The catalyst obtained in this manner is used in the isomerization of n-butane in admixture with hydrogen in a butene/hydrogen mol ratio of 0.5, pressure of 300 p.s.i.g., and temperature of 850° F., at a liquid volume hourly space velocity of 4.0. Under these reaction conditions, isobutane is obtained in a yield of 35% and selectivity of 92%.

*Example VIII*

A quantity of powdered beta-alumina trihydrate containing about 30% water is heated in air at 550° F. until the water content of the material is reduced to about 5%. The partially dried material is then impregnated with an aqueous solution of palladium chloride, sufficient to produce a concentration of 0.5% palladium in the final catalyst. The resulting mass is stirred and slowly dried at 230° F. for 16 hours, mixed with 1% graphite, pelleted in ⅛-inch pellets and activated by reduction in hydrogen at about 975° F. In this process, the pellets form very easily and, after being calcined to the eta-alumina form, are very strong and attrition-resistant.

This catalyst is used in the isomerization of n-butane under the last-described reaction conditions, and isobutane is obtained in a yield of about 38% and selectivity of 94%. It is noted that when the conditions of this invention are followed, the catalyst which is obtained is easier to produce, stronger and more attrition-resistant, and is more active in the conversion of n-butane to isobutane.

From these and other experiments, we have found that improved catalysts can be prepared following the teachings of this invention and an improved process of isomerization results from the use of these catalysts. In carrying out this invention, partially dehydrated beta-alumina trihydrate is formed into catalyst pellets using an ordinary commercial pelleting machine operated to produce high-strength pellets whose crushing strength is in the range of 20 to 100 p.s.i. It is preferred that the beta-alumina trihydrate be partially dried at a temperature in the range from about 450° to 600° F. to partially remove the water of hydration. Under these conditions, water is removed until the water content of the treated material is between about 3 and 15%, preferably between about 4 and 10%. After treatment under these conditions, the alumina can be pelleted readily. However, in order to obtain an isomerization catalyst of greater strength and higher isomerization activity, the partially dried beta-alumina hydrate is impregnated with a solution of a promoter metal, e.g., platinum, palladium or nickel, in the form of an easily reducible compound thereof. The impregnated alumina is then redried to a water content of about 5–15% and formed into pellets. The catalyst pellets are slowly heated at gradually increasing temperatures up to about 1000° F. so that the beta-alumina hydrate is converted to eta-alumina without appreciable formation of gamma-alumina. Catalysts which are prepared in this manner, using platinum or palladium as the promoter metal, can be used in the isomerization of n-butane at temperatures of about 800°–900° F., 200–1000 p.s.i.g., liquid volume hourly space velocity of 0.5 to 10, and butane/hydrogen mol ratio of 0.1 to 10. When the catalysts, containing nickel, platinum, or palladium, are heated with aluminum chloride at a temperature of about 400 to 600° F., for a period of about 8 hours, a substantial portion of the aluminum chloride combines with the catalyst support through the surface hydroxyl groups in the alumina. The catalyst is preferably heated with sufficient aluminum chloride to produce a concentration in the range of about 10 to 20% of combined aluminum chloride in the finished catalyst. After treatment with aluminum chloride, the catalyst is heated in an inert atmosphere, preferably in a slow flow of inert gas such as hydrogen, helium, nitrogen, etc., to remove excess aluminum chloride and adsorbed by-product hydrogen chloride. Catalysts which are prepared in this manner are more active for isomerization, and are easier formed and of higher physical strength. These catalysts are effective in the isomerization of n-butane at temperatures in the range of about 200–600° F., and function satisfactorily at the lower temperatures of this range.

While we have described our invention fully and completely with special emphasis upon several preferred embodiments thereof, we wish it to be understood that within the scope of the appended claim this invention may be practiced otherwise than as specifically described herein.

The embodiments of the invention in which an exclusive property or privilege is claimed follow:

1. The method of producing a highly active isomerization catalyst which consists in impregnating beta-alumina trihydrate with a solution of a reducible nickel salt to a nickel content of 0.5–5% by weight, adjusting the water content of the impregnated alumina to about 5–15% by weight of water and forming it into pellets, calcining the pellets slowly at a gradually increasing temperature up to about 1000° F. for a time sufficient to convert the alumina to eta-alumina without appreciable formation of gamma-alumina, and reducing them with hydrogen at elevated temperature sufficient to reduce the nickel salt to metal, heating the reduced material with aluminum chloride at a temperature to cause reaction between the aluminum chloride and surface hydroxyl groups in the eta-alumina, the amount of aluminum chloride being sufficient to cause 10–20% by weight to be chemically combined and chemisorbed on the catalyst, heating the resulting product in a stream of an inert gas to remove aluminum chloride not reacted or chemisorbed and to remove absorbed by-product hydrogen chloride.

2. The method in accordance with claim 1 in which the beta-alumina trihydrate is slowly calcined at 450–600° F., prior to being impregnated with the nickel salt, until the water content is reduced to 3–15% by weight, the impregnated alumina after adjusting the water content to 5–15% by weight is mixed with a binder, and the pellets are formed by subjecting the mixture containing the binder to a mechanical pellet-forming operation.

References Cited by the Examiner

UNITED STATES PATENTS

| | | | |
|---|---|---|---|
| 2,876,068 | 3/59 | Tertian et al. | 23—142 |
| 2,900,425 | 8/59 | Bloch et al. | 252—442 X |
| 2,915,365 | 12/59 | Saussol | 23—142 |
| 2,924,629 | 2/60 | Donaldson | 260—683.75 X |
| 2,950,243 | 8/60 | Brennan et al. | 252—466 |
| 2,965,694 | 12/60 | Stanley et al. | 260—683.67 |
| 2,991,256 | 7/61 | Hauel et al. | 252—466 |
| 3,000,813 | 9/61 | Michael | 252—442 X |
| 3,005,035 | 10/61 | Kimberlin et al. | 260—683.67 |
| 3,022,252 | 2/62 | Guyer et al. | 252—442 |
| 3,025,247 | 3/62 | Oleck | 252—466 |
| 3,112,351 | 11/63 | Hoekstra | 252—442 X |

MAURICE A. BRINDISI, *Primary Examiner.*

JULIUS GREENWALD, *Examiner.*

UNITED STATES PATENT OFFICE
CERTIFICATE OF CORRECTION

Patent No. 3,197,417  July 27, 1965

Hillis O. Folkins et al.

It is hereby certified that error appears in the above numbered patent requiring correction and that the said Letters Patent should read as corrected below.

Column 1, line 43, for "catlyst" read -- catalyst --; column 4, line 15, for "to", second occurrence, read -- at --; column 6, line 45, for "butene" read -- butane --.

Signed and sealed this 29th day of March 1966.

(SEAL)
Attest:

ERNEST W. SWIDER
Attesting Officer

EDWARD J. BRENNER
Commissioner of Patents